Dec. 24, 1968    J. M. MATSEN ET AL    3,418,169
DIRECT FEED FUEL CELL WITH POROUS HYDROPHOBIC DIFFUSER
Filed Oct. 4, 1965    2 Sheets-Sheet 1

JOHN M. MATSEN
DUANE G. LEVINE    INVENTORS

BY *Henry Berk*

PATENT ATTORNEY

United States Patent Office 3,418,169
Patented Dec. 24, 1968

3,418,169
DIRECT FEED FUEL CELL WITH POROUS HYDROPHOBIC DIFFUSER
John M. Matsen, Roselle, and Duane G. Levine, Fanwood, N.J., assignors to Esso Research and Engineering Company, a corporation of Delaware
Filed Oct. 4, 1965, Ser. No. 492,738
2 Claims. (Cl. 136—86)

ABSTRACT OF THE DISCLOSURE

In a direct feed fuel cell a porous hydrophobic diffuser element closing the fuel inlet conduit where fuel is injected into anolyte prevents back flow of electrolyte and water into said conduit.

---

Figure 1:
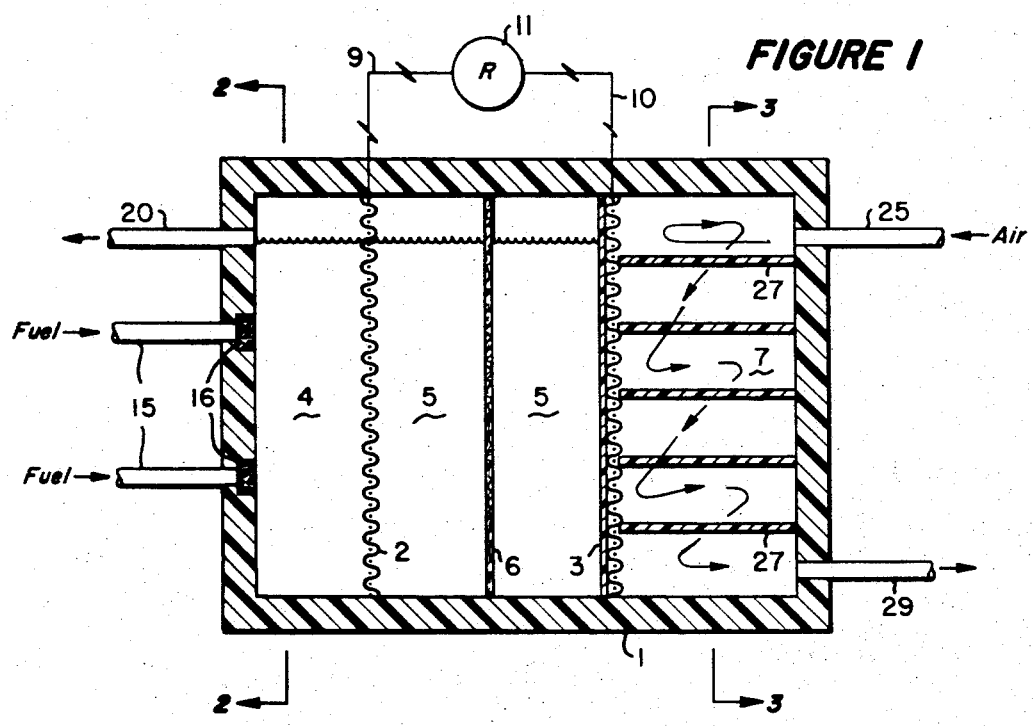

The present invention relates to direct feed electrochemical cells. In general, it relates to a fuel cell wherein a fluid carbonaceous fuel is fed directly to the anolyte compartment of said cell. In particular, it concerns an improved fuel cell and process for operating the same, in which cell a fluid fuel, for example liquid methanol, is added directly to the anolyte compartment.

The term "fuel cell" is used herein and in the art to denote a device system or apparatus wherein chemical energy of a combustible fluid fuel such as hydrogen, carbon monoxide or an organic compound is electrochemically converted to electrical energy at a nonsacrificial or inert electrode. A true fuel cell is adapted for continuous operation and is supplied with both fuel and oxidants from sources outside the cell proper. Such cells include at least two nonsacrificial or inert electrodes functioning as an anode and cathode, respectively, which are separated by an electrolyte which provides ionic conductance therebetween; conduction means for electrical connection between said anode and cathode external to such electrolyte; means for admitting a fluid fuel into dual contact with the anode and electrolyte; and means for admitting a fluid oxidant into dual contact with the cathode and electrolyte. Where necessary or desired the electrolyte compartment is divided into an anolyte compartment and a catholyte compartment by an ion permeable partition or ion-exchange membrane; such partitions or membranes are generally employed in cells wherein effective operation is dependent upon separation of fuel and oxidants and products thereof. Thus, in total cells wherein it is necessary or desirable to keep the electrolyte associated with one half cell substantially free of reactants and/or products of reaction associated with a half cell of opposite polarity, such partitions or membranes are generally employed.

The present invention relates to fuel cells of the type described above wherein efficient operation of the cell necessitates that the electrolyte compartment be divided into an anolyte compartment and a catholyte or oxidant compartment. Such a cell for example, is a methanol-air cell employing an aqueous acidic electrolyte, e.g., sulfuric acid.

In the prior art the means for admitting a fluid fuel into dual contact with the anode and anolyte have generally involved circulation of the fluid fuel-electrolyte solution (e.g., methanol-sulfuric acid) between the cell and an external sump. Such cells employ a "circulating electrolyte." Direct addition of fluid fuel to the anolyte compartment of a cell is desirable for many reasons. For example, "direct feed" eliminates the weight and parasitic power associated with a circulating electrolyte cell and in addition makes it easier to maintain proper electrolyte level within the cell. While the advantages of direct feed cells are apparent to those skilled in the art, heretofore several problems associated with direct feed operations have precluded the development of a direct feed cell comparable in performance to circulating electrolyte cells.

It has now been discovered and forms a basis of the present invention that an efficient direct fed cell can be provided. For example, by means of the present invention there may be provided a methanol-air direct feed cell which is comparable to conventional circulating electrolyte cells with respect to cell voltage, anode polarization, methanol oxidation at the cathode, etc.

An important requirement in direct feed cell operation is the avoidance of large fuel concentration gradients in the anolyte. Uniform concentration is necessary to produce good anode performance and to minimize fuel loss to the cathode. Thus, for example, if methanol is to be introduced directly into the anolyte chamber it must be well mixed with the electrolyte. By means of proper cell design, mixing of the fuel and the electrolyte can be facilitated by using the $CO_2$ leaving the anode to cause convection of the electrolyte. That is, internal circulation resulting from carbon dioxide evolution can be effective, in a properly designed cell, in uniformly distributing the fuel in the electrolyte. However, if internal circulation becomes excessive, excessive fuel will be required to maintain performance due to losses at the cathode. Excessive cathode fuel losses are inherent in cells wherein the anode cannot act as a barrier to fuel transport.

In the prior art, efforts have been made to separate the anolyte and catholyte by positioning ion permeable and/or ion-exchange membrane between the electrodes. Unfortunately, however, materials have not been found which will permit effective ionic conductance between the electrodes and at the same time prevent substantial transfer of fuel for any appreciable period of time.

In the operation of fuel cells wherein air is the oxidant, it has been found necessary to use air flow rates several times that required by stoichiometry. This places quite a load on the cell as far as heat and water balancing is concerned and, of course, necessitates a large air blower. High air rates also cause more chemical oxidation of the fuel which is of course undesirable. According to the present invention, horizontal baffles in the air chamber of the direct feed cell permit lower air rates to be used with no loss in cell performance.

In brief, the direct feed cell of a preferred embodimnt of the present invention comprises a fuel cell container or vessel wherein one wall contains hydrophobic diffuser elements for fuel injection and distribution, an anode, a membrane-clad cathode, a barrier between said anode and said membrane-clade cathode and horizontal baffles in the air chamber between said clad cathode and a cell wall.

The anode employed in the present invention can comprise a conductive wire screen with a catalyst bearing or catalyst comprising surface, e.g., a wire screen upon which platinum or another suitable catalyst has been chemically, electrochemically, or physically deposited by methods known in the art. Commonly assigned copending application S.N. 233,800, filed Oct. 29, 1962, now U.S. Patent No. 3,281,275, describes, for example, a suitable wire screen anode. Alternatively, the anode can comprise a catalyst coated membrane known in the art.

The membrane-clad cathode employed in the present invention comprises a screen type electrode onto which an electrolyte wetted membrane has been impressed. A suitable membrane-clad cathode is described, for example, in commonly assigned copending application S.N. 404,934, filed Oct. 19, 1964, now abandoned.

The barrier employed in the present invention in the interelectrode space between the anode and the membrane-clad cathode is a fuel diffusion barrier. A preferred barrier is made of "Dacron" polyester felt, about 60 mils thick. Alternately, an immobilized electrolyte may be employed as a fuel diffusion barrier in the interelectrode space. Such an electrolyte, for example, is a gel made from 3.7 molar sulfuric acid and polyethylene oxide.

The fuel diffuser elements employed in the present invention for fuel injection also serve to minimize or prevent back flow of water and/or electrolyte. The porous diffuser elements are constructed of a suitable hydrophobic material such as Teflon and permit passage of the fuel, e.g., methanol, while preventing passage of water and/or electrolyte. The diffuser elements are positioned and sealed in the cell wall so as to achieve suitable diffusion of the fuel into the electrolyte and to prevent leakage.

The horizontal baffles which can be employed in the air chamber of the direct feed cell of the present invention permit reduced air rates by reducing dead air pockets, thus insuring that all parts of the cathode receive sufficient air; by reducing backmixing; and by increasing linear air velocity within the chamber.

Figure 2:
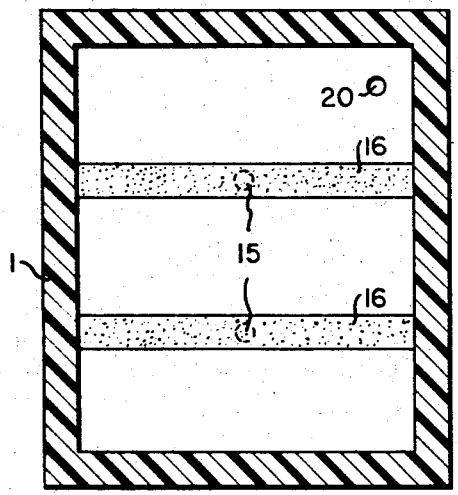
Figure 3:
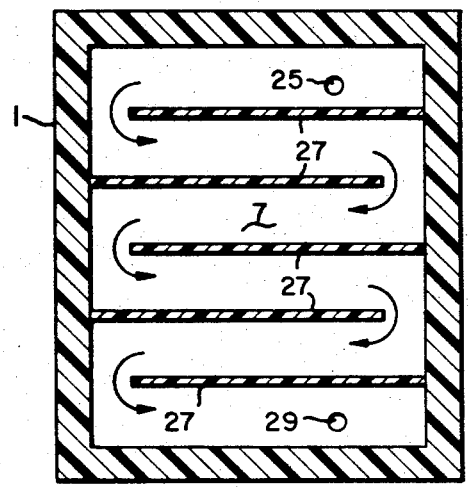

Referring now to the accompanying exemplary drawings there is shown in FIGURE 1 a schematic cross section of a direct feed cell of the present invention. FIGURE 2 shows a view of the fuel diffuser elements sealed in a cell wall. FIGURE 3 shows a cross section taken along line 3—3 of FIGURE 1.

Referring now to FIGURE 1 there is shown a fuel cell container or vessel 1 containing an anode 2, a membrane-clad cathode 3, an anolyte compartment 4, an interelectrode or electrolyte compartment 5, a barrier 6 and an air chamber 7. Anode 2 comprises, for example, a wire screen electrode impregnated with a catalyst. For example, anode 2 can be a 50 mesh tantalum wire screen onto which is pressed 20 mg./cm.$^2$ of a hydrogen reduced "black" consisting of 54% Pt, 36% Ru, and 10% Re. Membrane-clad cathode 3 is a tantalum screen supporting 9 mg./cm.$^2$ of Pt black in a Teflon binder and having impressed thereon a Permion 1010 membrane wetted with sulfuric acid. Anode 2 and cathode 3 are electrically connected via wires 9 and 10 and resistance means 11 which is symbolic of any electrical device or appliance adapted for receiving its power of activation from a direct electric current. Fuel conduits 15 provide means for introducing a fluid fuel, for example, methanol, into diffuser elements 16 in the cell wall. Anolyte compartment 4 is shown here to be substantially filled with an aqueous sulfuric acid electrolyte. Fuel exhaust conduit 20 provides means for removing carbon dioxide formed at anode 2 in electrochemical oxidation of the fuel. Interelectrode compartment 5 contains fuel diffusion barrier 6 shown here to be made of Dacron felt. Interelectrode compartment 5 may be equipped with various means (not shown) so as to provide, for example, escape means for any gaseous product formed at either of the electrodes which may escape their respective compartments. Air inlet conduit 25 provides means for introducing oxidant gas, e.g., air, into air chamber or catholyte compartment 7. Oxidant enters through inlet 25, passes through the substantially horizontal baffles 27 and out exhaust conduit 29.

Referring now to FIGURE 2 there is shown a section of cell wall 1 having sealed therein fuel diffuser elements 16 as described above. These elements comprise a porous hydrophobic material, preferably Teflon, provide for the even injection and diffusion of fuel, and prevent the leaking of water and/or electrolyte from the cell.

The foregoing description describes one mode of operation of the present invention. However, it is to be understood that said description does not limit the scope of the invention. One skilled in the art could easily modify the cell design to achieve substantially the same effects and such modifications are considered to be within the scope of the invention as claimed.

The following tests were carried out to illustrate the cell efficiency resulting from the use of the direct feed fuel cell of the instant invention. Details of the test procedures and the results obtained are set forth hereinafter. The test results are presented for purposes of illustration only, and the details should not be construed as limitations upon the true scope of the invention as set forth in the claims.

A direct feed methanol-air cell substantially as described in FIGURES 1 and 2 was operated at 60° C. using 3.7 molar $H_2SO_4$ as the electrolyte. No fuel diffusion barrier was employed. The cell voltage, anode and cathode polarization, and methanol oxidation at the cathode were measured and compared with the results obtained in an identical cell employing a circulating electrolyte. Thus, in these tests the cells employed were in all respect identical with the exception that in the direct feed cell of the present invention methanol was fed directly to the anolyte compartment through two Teflon fuel diffuser elements while in the circulating electrolyte system methanol was added to the circulating electrolyte by a sump external to the cell. The results are shown below in Table I.

TABLE I.—COMPARISONS OF DIRECT FEED AND CIRCULATING ELECTROLYTE CELLS
[60° C., 3.7 M $H_2SO_4$]

| | Direct feed | Circulating electrolyte |
|---|---|---|
| Current density, ma./cm.$^2$ | 40 | 40 |
| Cell potential, volts | 0.47 | 0.45 |
| Anode polarization from theory, volts | 0.31 | 0.33 |
| Cathode polarization from theory, volts | 0.40 | 0.39 |
| Chemical oxidation of methanol at the cathode, equivalent ma./cm.$^2$ | 10 | 8 |
| Feed Rate | (¹) | (²) |

¹ 1.2 u stoichiometric.
² 0.5 M methanol in 3.7 M $H_2SO_4$ 50% electrochemical conv. per pass.

In another series of tests, a direct feed cell of the present invention was operated with fuel diffusion barriers of Dacron felt or polyox gel. The results of these tests are shown in Table II.

TABLE II.—EFFECT OF DIFFUSION BARRIERS ON METHANOL CELL PERFORMANCE
[60° C., 3.7 M $H_2SO_4$]

| | Dacron Felt | Polyox Gel |
|---|---|---|
| Current density, ma./cm.$^2$ | 40 | 40 |
| Cell potential, volts | 0.42 | 0.43 |
| Anode polarization from theory, volts | 0.28 | 0.29 |
| Chemical oxidation of methanol at the cathode, equivalent ma./cm.$^2$ | 4.4 | 1.5 |

It is seen that the direct feed cells employing the barriers reduced the undesirable chemical oxidation of methanol at the cathode without substantially altering cell performance.

Modification of the cell design may be apparent to those skilled in the art without departing from the spirit or scope of the present invention as set forth in the claims.

What is claimed is:

1. A direct feed fuel cell comprising:
   (a) an anode,
   (b) an anolyte compartment,
   (c) a cathode,
   (d) an interelectrode electrolyte compartment between the anode and cathode,
   (e) conduction means for electrical connection between said anode and cathode external to electrolyte,
   (f) a fuel inlet conduit for admitting fuel to the anolyte compartment for dual contact with the anode and electrolyte in said compartment, and
   (g) a porous hydrophobic diffuser element closing said inlet conduit at its end in communication with the anolyte compartment to inject fluid fuel into said anolyte compartment and prevent back flow of electrolyte and water from said compartment into the fuel inlet conduit.

2. A direct feed fuel cell as defined by claim 1, wherein the porous hydrophobic element is a porous Teflon.

References Cited

UNITED STATES PATENTS

| | | | |
|---|---|---|---|
| 3,181,973 | 5/1965 | Duddy | 136—86 X |
| 3,244,564 | 4/1966 | Fox | 136—86 |
| 3,281,274 | 10/1966 | Moerikofer | 136—86 |
| 3,287,172 | 11/1966 | Shropshire et al. | 136—86 X |
| 3,297,484 | 1/1967 | Niedrach | 136—86 |
| 3,311,504 | 3/1967 | Johnson. | |

ALLEN B. CURTIS, *Primary Examiner.*

U.S. Cl. X.R.

136—162